US009888256B2

(12) United States Patent
Amer et al.

(10) Patent No.: US 9,888,256 B2
(45) Date of Patent: Feb. 6, 2018

(54) TECHNIQUE TO CONSTRAIN A VIDEO SLICE SIZE WITH REDUCED PERFORMANCE PENALTY ON PIPELINED ENCODER ARCHITECTURES

(71) Applicant: ATI Technologies ULC, Markham (CA)

(72) Inventors: Ihab M. A. Amer, Stouffville (CA); Khaled Mammou, Thornhill (CA); Edward Harold, Scarborough (CA); Lei Zhang, Richmond Hill (CA); Steven Lok-Man Doo, Aurora (CA); Jonathon Walter Riley, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 157 days.

(21) Appl. No.: 14/612,816

(22) Filed: Feb. 3, 2015

(65) Prior Publication Data
US 2016/0227242 A1 Aug. 4, 2016

(51) Int. Cl.
| *H04N 19/593* | (2014.01) |
| *H04N 19/117* | (2014.01) |
| *H04N 19/174* | (2014.01) |
| *H04N 19/176* | (2014.01) |
| *H04N 19/51* | (2014.01) |
| *H04N 19/52* | (2014.01) |
| *H04N 19/91* | (2014.01) |

(Continued)

(52) U.S. Cl.
CPC ........ *H04N 19/593* (2014.11); *H04N 19/117* (2014.11); *H04N 19/174* (2014.11); *H04N 19/176* (2014.11); *H04N 19/51* (2014.11); *H04N 19/52* (2014.11); *H04N 19/61* (2014.11); *H04N 19/91* (2014.11)

(58) Field of Classification Search
CPC .... H04N 19/174; H04N 19/176; H04N 19/51; H04N 19/593; H04N 19/61; H04N 19/91
See application file for complete search history.

(56) References Cited

U.S. PATENT DOCUMENTS

| 2006/0233236 A1* | 10/2006 | Labrozzi | .......... H04N 21/44025 |
| | | | 375/240.03 |
| 2012/0106652 A1* | 5/2012 | Huang | .................. H04N 19/70 |
| | | | 375/240.25 |

(Continued)

*Primary Examiner* — Obafemi Sosanya
(74) *Attorney, Agent, or Firm* — Faegre Baker Daniels LLP

(57) ABSTRACT

Methods and apparatus that allow encoding of video data in pipelined encoder architectures with reduced encoding performance penalty. The methods and apparatus encode video data without the need to flush the data pipeline and re-encode macroblocks, thus saving time and resulting in an increase in the encoder's throughput. In one embodiment, macroblocks are encoded in a data pipeline to form a first video slice of a plurality of video slices. Once a macroblock overshoot condition occurs, the overshooting macroblock is determined and a second video slice is formed that includes at least one of the overshooting macroblock and the encoded macroblocks without re-encoding the included overshooting macroblock and encoded macroblocks. For example, a second video slice may be formed from the overshooting macroblock, and any remaining encoded macroblocks, that do not form the first video slice.

20 Claims, 10 Drawing Sheets

(51) Int. Cl.
*H04N 19/61* (2014.01)
*H04N 19/119* (2014.01)
*H04N 19/70* (2014.01)
*H04N 19/124* (2014.01)

(56) References Cited

U.S. PATENT DOCUMENTS

2013/0128949 A1* 5/2013 Sezer .................. H04N 19/119
 375/240.02
2015/0288965 A1* 10/2015 Li ........................ H04N 19/124
 375/240.03

* cited by examiner

TECHNIQUE TO CONSTRAIN A VIDEO SLICE SIZE WITH REDUCED PERFORMANCE PENALTY ON PIPELINED ENCODER ARCHITECTURES

BACKGROUND OF THE DISCLOSURE

The disclosure relates generally to video image processing and more particularly to methods and apparatus for reducing performance penalties in pipelined video encoder systems.

One goal of video encoding systems is to send video data as quickly as possible, thus minimizing the amount of delay between the encoding process and the reception of the video. One way of minimizing this delay is to attempt to increase network efficiency by placing as much video data as possible into each data packet, so as to minimize overhead data. For example, pipelined video encoding systems may attempt to pack as many encoded video macroblocks as possible into a video slice, up to any maximum slice size. A video slice may include any encoded group of one or more of macroblocks that on its own represents a spatially distinct area of a video frame. For example, a video slice may include one or more sequential macroblocks in a row of a video frame. The video slice may be grown by including additional sequential macroblocks from that video frame row, until the end of the video frame row is reached. If the video slice is desired to be larger, then macroblocks from the next row in the video frame, beginning with the macroblock at the beginning of the next row, for example, may be added. Typically, a pipelined video encoding system will blindly pack video macroblocks into a video slice until a macroblock overshoot occurs, such that the maximum allowed slice size has been reached and the video slice cannot accommodate the overshooting macroblock. Thus, in this situation, the overshooting macroblock may need to be re-encoded and then placed in the proceeding video slice.

At least one drawback with this approach, however, is that once an overshoot occurs network inefficiencies may be introduced. For example, a typical pipelined video encoder conforming to the H.264 standard will include various stages of encoding. These stages may include an inter-prediction stage and an entropy encoding stage. As defined in the H.264 standard, however, video slices do not allow for intra-prediction among macroblocks of different video slices. For example, the inter-prediction encoder may rely on macroblocks in the same video slice during prediction processing for a given macroblock, but may not rely on macroblocks in other video slices. Thus, once a macroblock overshoot occurs, macroblocks that have undergone inter-prediction encoding may need to be re-encoded because they will belong to a different video slice. A pipelined video encoder may re-encode macroblocks by flushing the data pipeline, and re-encoding the macroblocks into the data pipe. These and other processing techniques introduce encoding inefficiencies, causing a drop in encoding throughput.

Some video encoding methods, such as the one defined by the High Efficiency Video Coding ("HEVC") standard, do allow intra-prediction between video slices by the use of the "dependent slice" video coding unit. Dependent slices were introduced into the HEVC standard mainly to reduce latency in the transmission of video data. For example, by allowing intra-prediction, data within video slices is potentially made available to a system sooner (e.g. with less latency) because the entire video slice does not have to be decoded for the data to be made available. However, although the use of dependent slices may reduce latency in a system, the problems relating to encoding throughput are not solved.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
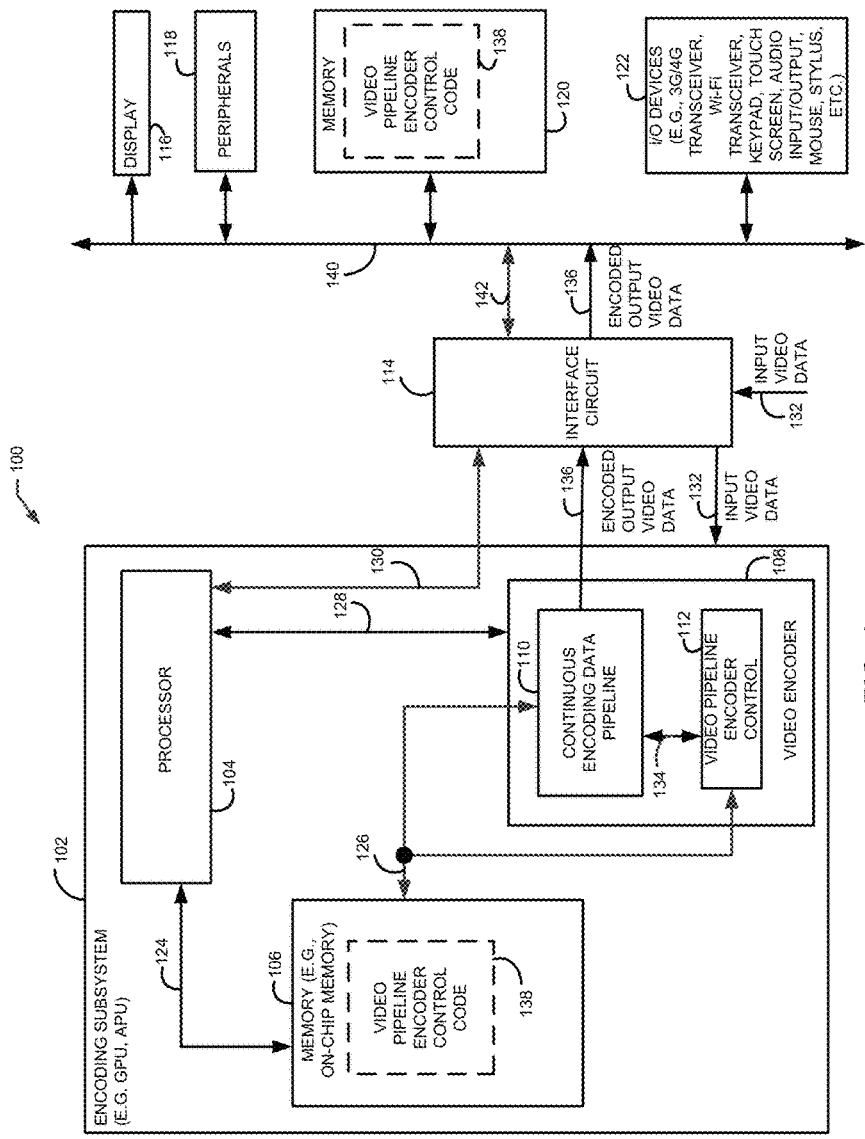
FIG. 1 is a functional block diagram illustrating an example apparatus including video encoder logic comprising continuous encoding data pipeline logic, which may be associated with a processor, such as, for example, a graphics processing unit (GPU), to encode video data.

Briefly, methods and apparatus that allow encoding of video data in pipelined encoder architectures with reduced encoding performance penalty. The methods and apparatus encode video data without the need to flush the data pipeline and re-encode macroblocks, thus saving time and resulting in an increase in the encoder's throughput. In one example, the apparatus and methods insert into a second slice encoded macroblocks, that were encoded in a first encoding pass through the pipeline for one or more macroblocks, in response to an encoded macroblock overshoot condition. This may be in contrast to flushing the pipeline and re-encoding video data corresponding to the overshooting macroblock in a second pipelined encoding pass. In one embodiment, video encoder logic encodes macroblocks in a data pipeline to form a first video slice of a plurality of video slices. Overshoot condition logic may determine a macroblock overshoot condition indicating that a video slice has reached a maximum number of macroblocks (e.g. the number of macroblocks forming the first video slice has reached a maximum number). In one embodiment, the overshoot condition logic determines a macroblock overshoot condition when a maximum slice size of macroblocks from the data pipeline has been encoded into a first video slice. In response to a macroblock overshoot condition, the video encoder forms a second video slice that includes at least one of the overshooting macroblock and the encoded macroblocks without re-encoding the included overshooting macroblock and encoded macroblocks. For example, macroblock overshoot logic may determine the overshooting macroblock (e.g. the next encoded macroblock after the first video slice has reached a maximum number of macroblocks), and in response, the video encoder forms a second video slice that includes at least one of the overshooting macroblock and the encoded macroblocks without re-encoding the included overshooting macroblock and encoded macroblocks. For example, a second video slice may be formed from the overshooting macroblock, and any remaining encoded macroblocks, that do not form the first video slice, without having to re-encode these already encoded macroblocks.

Among other advantages, eliminating the need to flush and re-encode the data pipeline saves computational time, thereby allowing the encoding process to proceed more quickly. As a result, the encoding performance penalty is reduced, increasing encoder throughput. Moreover, computational power is saved, as there is no need to re-encode the data pipeline. This allows the same encoded data to be provided using less processing resources. Thus, a power savings is also realized. Other advantages will be recognized by those of ordinary skill in the art.

In one embodiment, determination logic determines whether an encoding scheme supports intra-prediction between a plurality of video slices. The video encoder logic, based on that determination, is operative to not flush the data pipeline when the encoding scheme supports intra-prediction between the plurality of video slices. For example, in one embodiment, the determination logic may access control registers that indicate whether the encoding scheme supports intra-prediction between a plurality of video slices.

In one embodiment, entropy encoding logic entropy encodes a plurality of video slices. For example, the plurality of video slices may be context-adaptive binary arithmetic coding (CABAC) encoded, as may be used with the H.264 or High Efficiency video Coding (HEVC) standards. In one embodiment, the entropy encoding classifies the last fully entropy encoded macroblock as a last macroblock in a video slice. For example, in one embodiment, when the overshoot condition logic determines the macroblock overshoot condition, the entropy encoding logic re-entropy encodes the last fully entropy encoded macroblock with an end-of-slice indication. The end-of-slice indication may be a flag in a header field of a macroblock indicating that the macroblock is the final macroblock of the current video slice. In one embodiment, the entropy encoding logic re-entropy encodes the overshooting macroblock. For example, in the case of the HEVC standard, if CABAC entropy encoding is being utilized, an overshooting macroblock that was CABAC encoded may be re-CABAC encoded and become the first macroblock in a new video slice. In one embodiment, the entropy encoding logic re-entropy encodes one or more macroblocks, but a re-entropy encoded macroblock is selected for inclusion in a video slice only if the macroblock is an overshooting macroblock. For example, the entropy encoding logic may remain enabled to allow entropy encoding of all macroblocks, but a re-entropy encoded macroblock is included as the first macroblock of a next video slice only if the macroblock is an overshooting macroblock. Thus, for example, a time savings may be realized, such that once the overshoot condition logic determines the macroblock overshoot condition, the overshooting macroblock has already been re-entropy encoded.

In one embodiment, the apparatus may include a decoder that may decode the encoded video data. The apparatus may also include a display to display the video data. In one embodiment, the apparatus may include one or more video encoding stages including integer motion estimation logic, fractional motion estimation logic, and transform encoding logic that may operate on a plurality of video slices. In one embodiment, the apparatus further includes transmitting logic that may transmit the encoded video data to a remote video decoder. In one embodiment, the apparatus includes one or more of an accelerated processing unit (APU), a central processing unit (CPU), and a graphics processing unit (GPU), where alone or together they include one or more of the video encoder logic, the overshoot condition logic, and the macroblock overshoot logic, and are operative to provide the encoded video data for display on a display.

Turning now to the drawings, and as described in detail below, one example of the presently disclosed system is a video encoder comprising an encoder with a continuous encoding data pipeline. The video encoder may encode video data in a pipelined manner, proceeding through various encoding stages. For example, one stage may include integer motion estimation. As other examples, other stages may include fractional motion estimation, transform coding, predictive coding, and entropy encoding. At the predictive coding stage, macroblocks in one video slice may or may not be allowed to depend on macroblocks in another video slice (e.g. inter-prediction coding vs. intra-prediction coding). To increase encoder throughput, if intra-prediction is allowed, then the macroblocks in the data pipeline that have proceeding through the intra-prediction stage need not be predictively encoded again when establishing a new video slice. For example, instead of flushing the data pipeline to create a new video slice, the already predictively encoded macroblocks may proceed to the next stage of processing, saving processing time and power. The video encoder may then provide encoded output video data.

FIG. 1 is a functional block diagram illustrating an example apparatus 100 that includes encoding logic such as described above and in further detail below. The apparatus 100 may be, for example, any suitable device with video encoding capability such as, but not limited to, a mobile or smart phone, a phablet, a tablet, a laptop computer, a camera, portable media player, or any other suitable device including any suitable battery-equipped device, for example. More specifically, as illustrated in FIG.1, the apparatus 100 includes an encoding subsystem 102, which includes a video encoder 108, a memory 106 such as on-chip memory, and a processor 104 such as a microcontroller or Central Processing Unit (CPU). The video encoder 108 includes an encoder with a continuous encoding data pipeline 110 and a video pipeline encoder control 112. The memory 106 may communicate with, for example, processor 104 by way of communication link 124. For example, the memory may hold executable instructions, such as video pipeline encoder control code instructions, to be executed by processor 104. As will be appreciated, the video encoder 108 may also include the functionality of processor 104 in various embodiments of the present disclosure.

In some embodiments, encoding subsystem 102 may be an accelerated processing unit (APU), which may include one or more CPU cores or one or more General Processing Unit (GPU) cores on a same die. Alternatively, one or more of processor 104, memory 106, and video encoder 108 may include one or more digital signal processors (DSPs), one or more Field Programmable Gate Arrays (FPGAs), or one or more application-specific integrated circuits (ASICs). In some embodiments, some or all of the functions of processor 104, memory 106, and video encoder 108 may be performed by any suitable processors.

In some embodiments, some or all of the encoder with continuous encoding data pipeline logic 110, the video pipeline encoder control logic 112, and any other logic described herein may be implemented by executing suitable instructions on, for example, processor 104 or any other suitable processor. In some examples, the executable suitable instructions may be stored on a computer readable storage medium, where the executable instructions are executable by one or more processors to cause the one or more processors to perform the actions described herein. In some embodiments, executable instructions may be stored on memory 106 or any other suitable memory that include video pipeline encoder control code 138 that when accessed over communication link 124 and executed by processor 104 or any other suitable processor, control the video encoder 108 or parts thereof. For example, processor 104 may control the video encoding process by accessing the video encoder 108 over communication link 128. For example, video encoder 108 may include registers or other control mechanisms, such as within the video pipeline encoder control logic 112, that control some or all of the video encoding process. For example, communication link 134 may provide control information, data, or signals to the encoder with continuous encoding data pipeline 110 to control the video encoding process. Some or all of this functionality may also be implemented in any other suitable manner such as but not limited to a software implementation, a firmware implementation, a hardware implementation, or any suitable combination of the example implementations described above.

As described further below, the encoder with continuous encoding data pipeline 110 may encode macroblocks in a data pipeline to form a first video slice of a plurality of video slices. The encoder with continuous encoding data pipeline 110 may also determine a macroblock overshoot condition and the overshooting macroblock. In response to a macroblock overshoot condition, the encoder with continuous encoding data pipeline 110 forms a second video slice that includes at least one of the overshooting macroblock and the encoded macroblocks, without re-encoding at least one of the overshooting macroblock and the encoded macroblocks.

For example, macroblocks in a data pipeline may be encoded, in a first pass through an encoding stage, and used to form a first video slice. Once a macroblock overshoot condition is determined, at least one of the overshooting macroblock, and other macroblocks that were encoded prior to the overshoot condition, may be used to form a second video slice without again passing through the same encoding stage. As discussed above, some or all of these functions may be performed by one or more processors executing software, firmware, or by any suitable hardware.

As shown in FIG. 1, the encoding subsystem 102 may receive input video data 132 containing video data to be encoded. In one embodiment, the encoder with continuous encoding data pipeline 110 may receive the input video data 132 to be encoded. In another embodiment, the input video data 132 may be stored in memory 106 over communication link 126, for example, by the video pipeline encoder control logic 112. In some embodiments, the encoder with continuous encoding data pipeline 110 may receive the input video data 132 from the memory 106 to be encoded over communication link 126 or any other suitable communication link. In some embodiments, interface circuit 114 may receive input video data 132, which then provides input video data 132 to encoding subsystem 102.

After the encoding process is performed as described above, the encoder with continuous encoding data pipeline 110 may generate encoded output video data 136 that may be provided to interface circuit 114. The interface circuit 114 may in turn provide encoded output video data 136 to expansion bus 140. The expansion bus 140 may further connect to, for example, a display 116; one or more peripheral devices 118; an additional memory 120 and one or more input/output (I/O) devices 122. The display 116 may be a cathode ray tube (CRTs), liquid crystal displays (LCDs), or any other type of suitable display. Thus, for example, after encoding the video data, the encoding subsystem 102 may provide the encoded output video data 136 for display on the display 116 and/or to any other suitable devices via, for example, the expansion bus 140. In some embodiments, the generated output video data 136 may be stored in memory, such as memory 106, memory 120, or any other suitable memory, to be accessed at a future time.

In some embodiments, executable instructions that may include some or all of the encoder with continuous encoding data pipeline logic 110, the video pipeline encoder control logic 112, and any other logic described herein may be stored in the additional memory 120 in addition to or instead of being stored in the memory 106. Memory 120 may also include, for example, video pipeline encoder control code 138 that may be accessed by processor 104, or any other suitable processor, over communication link 130 to interface circuit 114. Interface circuit 114 allows access to expansion bus 140 over communication link 142, thus allowing processor 104 access to memory 120. The one or more I/O devices 136 may include, for example, one or more cellular transceivers such as a 3G or 4G transceiver; a Wi-Fi transceiver; a keypad; a touch screen; an audio input/output device or devices; a mouse; a stylus; a printer; and/or any other suitable input/output device(s).

Figure 2:
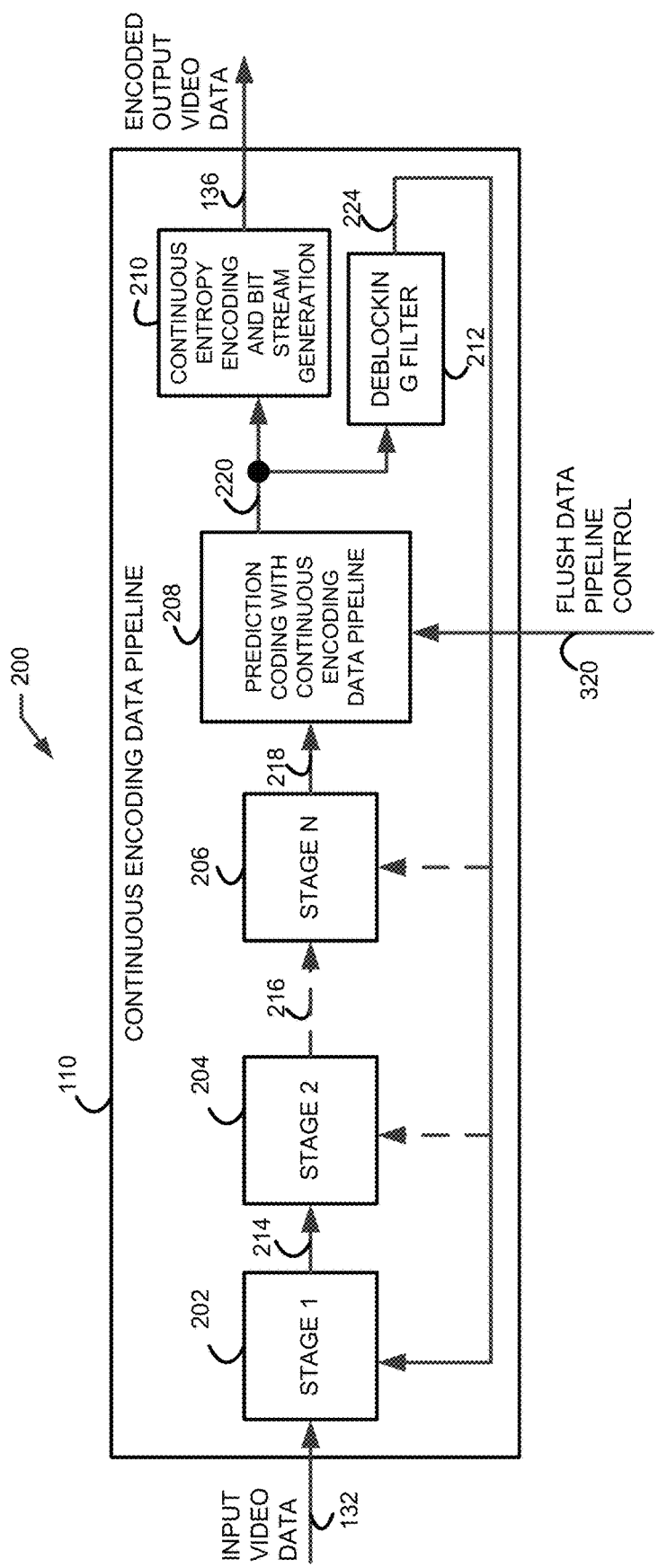
FIG. 2 is a functional block diagram illustrating an example of further detail of the operation of the continuous encoding data pipeline logic, including prediction coding with continuous encoding data pipeline logic and continuous entropy encoding and bit stream generation logic.

FIG. 2 is a functional block diagram illustrating an example of further detail of the operation of the encoder with continuous encoding data pipeline logic 110. The encoder with continuous encoding data pipeline logic 110 receives input video data 132 and may, for example, process the input video data 132 according to various stages of video processing. For example, the input video data may first enter stage 1 logic 202. Stage 1 logic 202 may be, for example, logic comprising one or more of block matching motion estimation, integer motion estimation, fractional motion estimation, transform coding, or any other video encoding stage as known in the art. Stage 1 logic 202 may also receive deblocked video data 224 from deblocking filter 212, as described below. Optionally, stage 2 logic 204 may receive, for example, the stage 1 output video data 214 of the stage 1 logic 202. For example, if stage 1 logic 202 included integer motion estimation logic, then stage 2 logic 204 may receive motion estimated video data as stage 1 output video data 214. As appreciated, the encoder with continuous encoding data pipeline logic 110 may include one or more stages of video processing, represented in FIG. 2 by stage n logic 206 and stage n input data 216. The prediction coding with continuous encoding data pipeline 208 receives video data to be predictively encoded 218 to predictively encode that data, as described in further detail below. Although FIG.

2 shows the prediction coding with continuous encoding data pipeline logic 208 receiving stage n output video data, it will be appreciated that the various stages of video encoder logic may be performed in any order as known in the art. For example, stage 2 logic 204 processing may be performed before stage 1 logic 202 processing. Similarly, intra-prediction coding with continuous encoding data pipeline logic 208 processing may be performed before or after stage n logic 206 processing.

The prediction coding with continuous encoding data pipeline logic 208 may also include determination logic that determines whether an encoding scheme supports intra-prediction between the plurality of video slices. The prediction coding with continuous encoding data pipeline logic 208 may not flush the data pipeline when the determination logic determines that the encoding scheme supports intra-prediction between the plurality of video slices. For example, encoding schemes that do not support intra-prediction between video slices do not allow for prediction encoding based on macroblocks of different video slices, but may allow for prediction encoding based on macroblocks in the same video slice. In contrast, encoding schemes that do support intra-prediction between video slices do allow for prediction encoding based on macroblocks of different slices. The determination logic may include, for example, a register setting indicating whether intra-prediction is supported by the encoding scheme, that may be also be programmable by processor 104 or any other suitable processor.

The prediction coding with continuous encoding data pipeline logic 208 may include a flushing capability such that when enabled may flush any macroblocks in the data pipeline. Flush data pipeline control 320 provides such indication, which is discussed in further detail below with respect to FIG. 3. For example, in the case where the determination logic determines that intra-prediction is not supported, the flushing capability allows for the flushing of the data pipeline to allow macroblocks that were encoded for a first video slice to be re-encoded into the data pipeline to form a second video slice, whereby those re-encoded macroblocks do not rely on macroblocks in the first video slice for prediction coding purposes. For example, the overshooting macroblock may be determined, and re-encoded into the data pipeline to form a second video slice. Furthermore, the prediction coding with continuous encoding data pipeline logic 208 may include a data buffer, such that the pre-encoded macroblock data would still be accessible after a macroblock overshoot condition is determined, so as to allow re-encoding of the pre-encoded macroblock data.

The prediction coding with continuous encoding data pipeline logic 208 may provide predicted macroblock data 220 to continuous entropy encoding and bit stream generation logic 210, which is described in further detail below with respect to FIG. 3. The predicted macroblock data 220 may also be provided to deblocking filter 212, which in turn may then provide deblocked video data 224 to one or more of the stages of video processing including, for example, stage 1 logic 202, stage 2 logic 204, or stage n logic 206.

Figure 3:
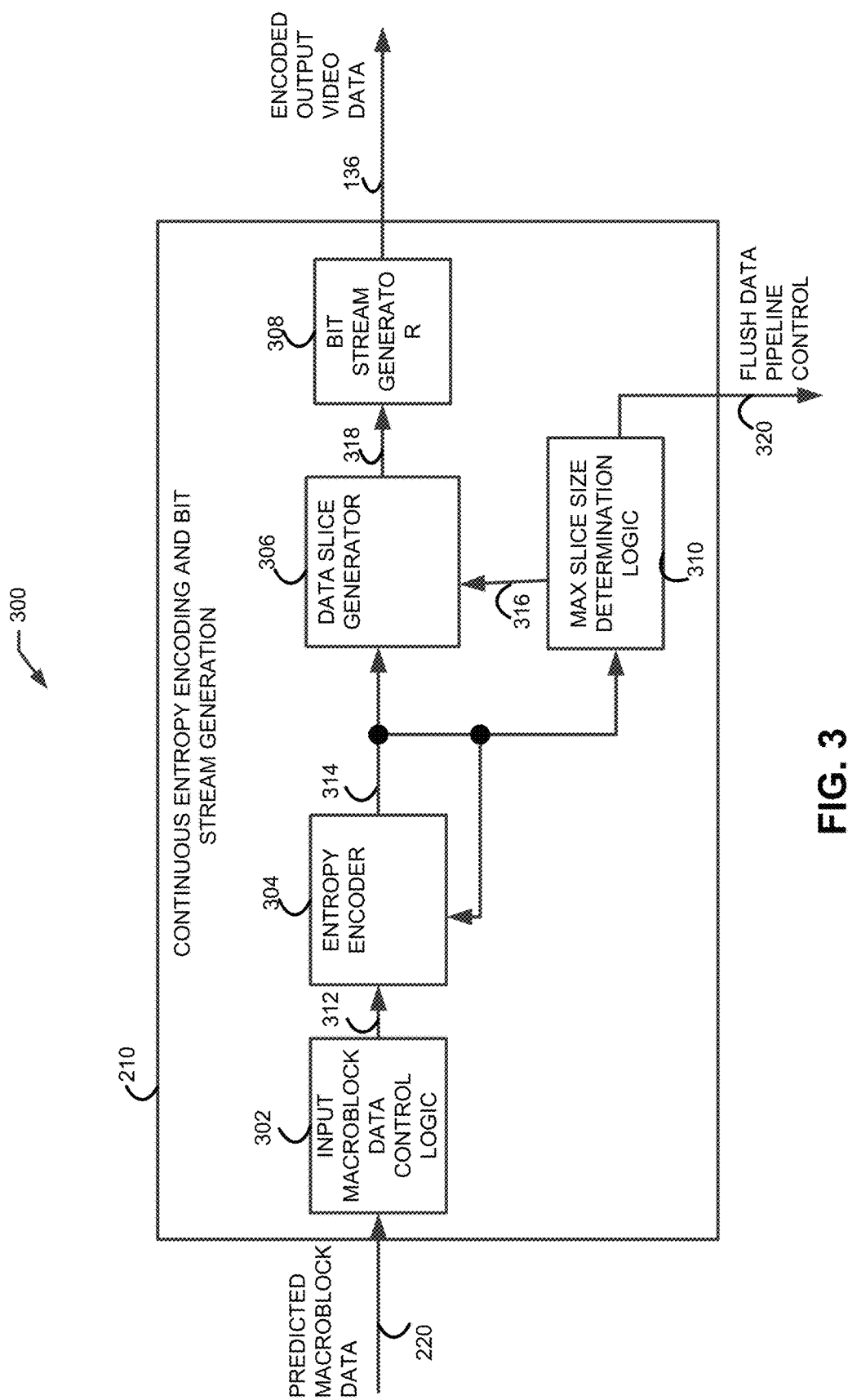
FIG. 3 is a functional block diagram illustrating an example of further detail of the operation of the continuous entropy encoding and bit stream generation logic.

FIG. 3 is a functional block diagram illustrating an example of further detail of the continuous entropy encoding and bit stream generation logic 210. The predicted macroblock data 220 may be received, for example, by input macroblock data control logic 302, which may buffer and otherwise control and or format the predicted macroblock data 220 so as to provide it as received macroblock data 312 for entropy processing to the entropy encoder 304. After entropy processing, entropy encoder 304 may provide entropy encoded macroblocks 314 to the data slice generator logic 306, as well as indication to the max slice size determination logic 310 that an encoded macroblock has been provided to the data slice generator logic 306. For example, the entropy encoder may provide the encoded macroblocks 314 to the max slice size determination logic 310 when they are provided to the data slice generator logic 306. The data slice generator logic 306 prepares a first video slice by arranging macroblocks into the first video slice. The max slice size determination logic 310 may determine that the first video slice has reached a maximum allowed slice size, and thus signal a macroblock overshoot condition when the next encoded macroblock 314 is provided to the data slice generator logic. For example, the max slice size determination logic 310 may count the encoded macroblocks 314 being arranged into the first video slice until a maximum allowed slice size has been reached, indicating a macroblock overshoot condition 316. For example, the max slice size counter logic 310 may have a register that may be programmed by any suitable process, such as processor 104 in FIG. 1, which indicates the maximum allowed slice size. The macroblock overshoot condition 316 may be indicated to the entropy encoder 304, whereby the entropy encoder 304 may re-entropy encode the overshooting macroblock, and may also re-entropy encode the last fully entropy encoded macroblock with an end-of-slice indication.

The macroblock overshoot condition may also be indicated to the data slice generator logic 306 by the macroblock overshoot signal 316. The data slice generator logic 306 provides video slice data 318 to the bit stream generator logic 308. For example, upon a macroblock overshoot condition, as may be indicated by macroblock overshoot signal 316, video slice data 318 may be provided by the data slice generator logic 306 to the bit stream generator 308. The bit stream generator 308 may in turn provide the encoded output video data 136. For example, bit stream generator 308 may serialize the video slice data to provide the encoded output video data 136 in a serial format.

The max slice size determination logic 310 may also provide a flush data pipeline control signal 320, which may be provided to prediction coding with continuous encoding data pipeline logic 208 as described above. For example if intra-prediction of the predicted macroblock data 220 is allowed, the flush data pipeline control signal 320 may not indicate a flush condition, so as to not flush a data pipeline. For example, the flush data pipeline control signal 320 would not indicate to the prediction coding with continuous encoding data pipeline 208 that a flush condition exists, and any already encoded macroblocks in the data pipeline of the prediction coding with continuous encoding data pipeline logic 208 would not be re-encoded. Alternatively, if intra-prediction of the predicted macroblock data 220 is not allowed, then upon a macroblock overshoot condition, as may be indicated by macroblock overshoot signal 316, the flush data pipeline control signal 320 may indicate a flush condition, so as to flush a data pipeline. For example, the flush data pipeline control signal 320 would indicate to the prediction coding with continuous encoding data pipeline logic 208 that a flush condition does exist, and any encoded macroblocks in the data pipeline may be flushed.

Figure 4:
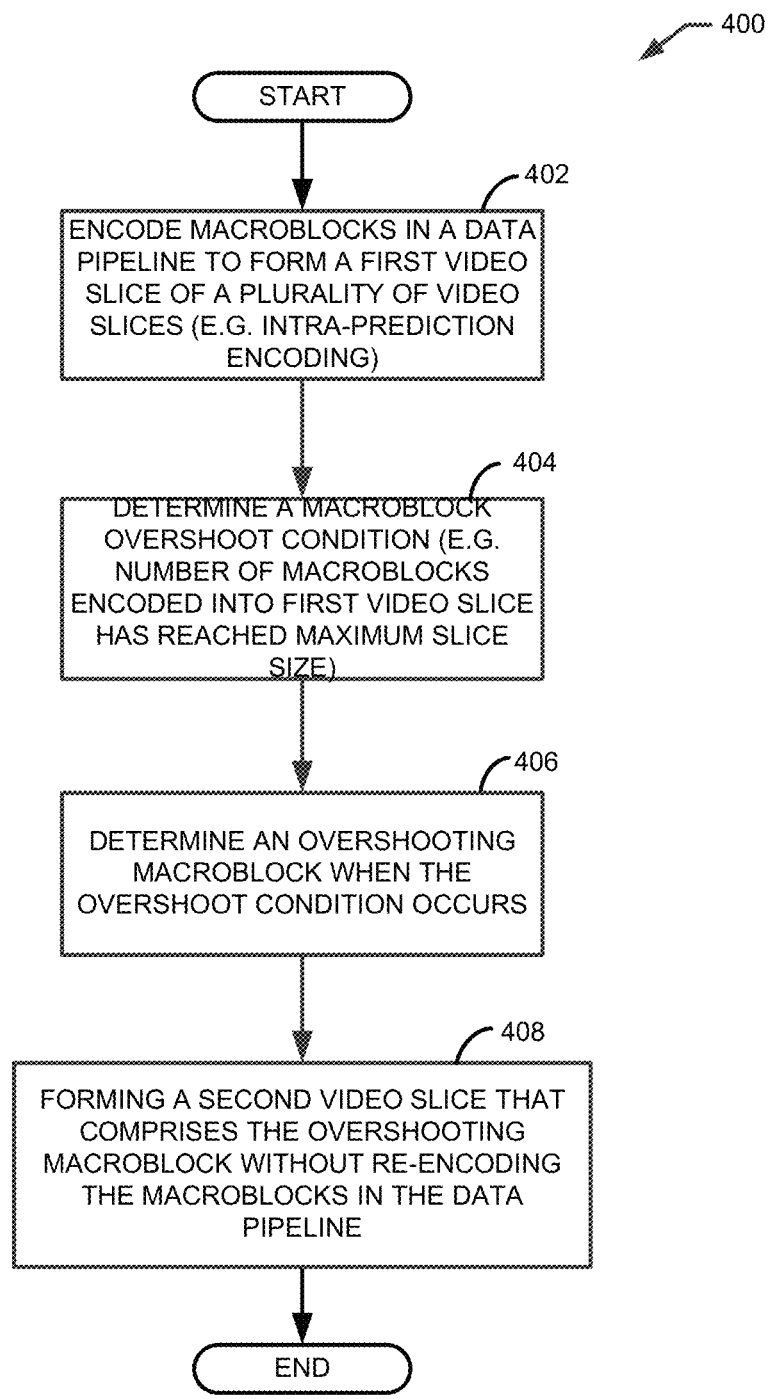
FIG. 4 is a flowchart of an example method for encoding video data into video slices.

FIG. 4 is a flowchart of an example method for encoding video data. The method illustrated in FIG. 4, and each of the example methods described herein, may be carried out by one or more suitably programmed controllers or processors executing software (e.g., by processor 106 executing suitable instructions). The method may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the method(s) is/are described with reference to the illustrated flowcharts (e.g., in FIG. 4), it will be appreciated that many other ways of performing the acts associated with the method(s) may be used. For example, the order of some operations may be changed, and some of the operations described may be optional. Additionally, while the method(s) may be described with reference to the example apparatus 100, it will be appreciated that the method(s) may be implemented by other apparatus as well, and that the apparatus 100 may implement other methods.

The example method begins at block 402 where macroblocks in a data pipeline are encoded to form a first video slice of a plurality of video slices. For example, macroblocks may be intra-predictively encoded into a first video slice, as may be performed by the prediction coding with continuous encoding data pipeline logic 208 of FIG. 2. The method continues with block 404, where a macroblock overshoot condition is determined, as may be indicated by the max slice size determination logic 310 of the apparatus 100. Proceeding on to block 406, an overshooting macroblock is determined when the macroblock overshoot condition is determined, such as may be performed by the data slice generator logic 306 of apparatus 100. Next, in block 408, in response to a macroblock overshoot condition, a second video slice is formed that includes the overshooting macroblock without re-encoding the macroblocks in the data pipeline, as may be performed by the data slice generator logic 306 and prediction coding with continuous encoding data pipeline logic 208 as described above.

Figure 5:
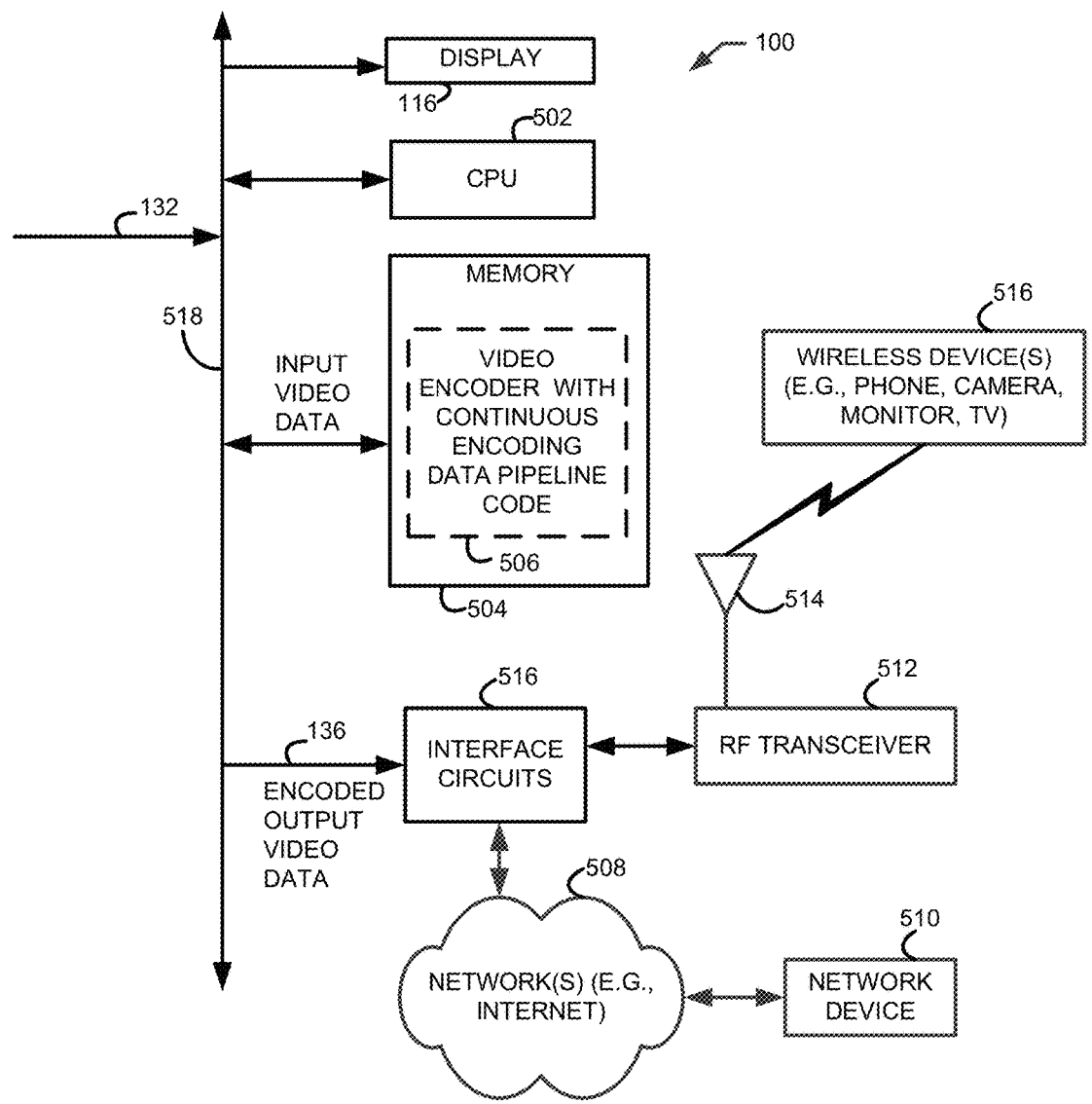
FIG. 5 is a functional block diagram illustrating an example apparatus including a central processing unit ("CPU") and video encoder with continuous encoding data pipeline code residing in memory.

FIG. 5 is a functional block diagram of another embodiment of an example apparatus 100 that includes CPU 502 and memory 504. The memory 504 may store executable instructions including video encoder with continuous encoding data pipeline code 506 that when executed by the CPU perform some or all of the functions of the video encoder 108 of FIG. 1. For example, the CPU may execute instructions, including the video encoder with continuous encoding data pipeline code 506, to perform the functions of the prediction coding with continuous encoding data pipeline logic 208 and continuous entropy encoding and bit stream generation logic 210 as described above. The CPU 502 may receive the input video data 132 via the expansion bus 518, perform the aforementioned processing, and provide the encoded output video data 136 to interface circuits 516. Interface circuits may be operatively coupled to one or more networks 508, such as, for example, the internet, and may also be operatively coupled to one or more RF transceiver 512. Thus, via the interface circuits 516, the encoded output video data 136 may be provided to either local or remote devices. For example, network device 510 may receive the encoded output video data 136 via network 508. Similarly, one or more wireless devices 516 may receive encoded output video data 136 via a transmission from antennae 514, which is operatively coupled to RF transceiver 512.

Figure 6:
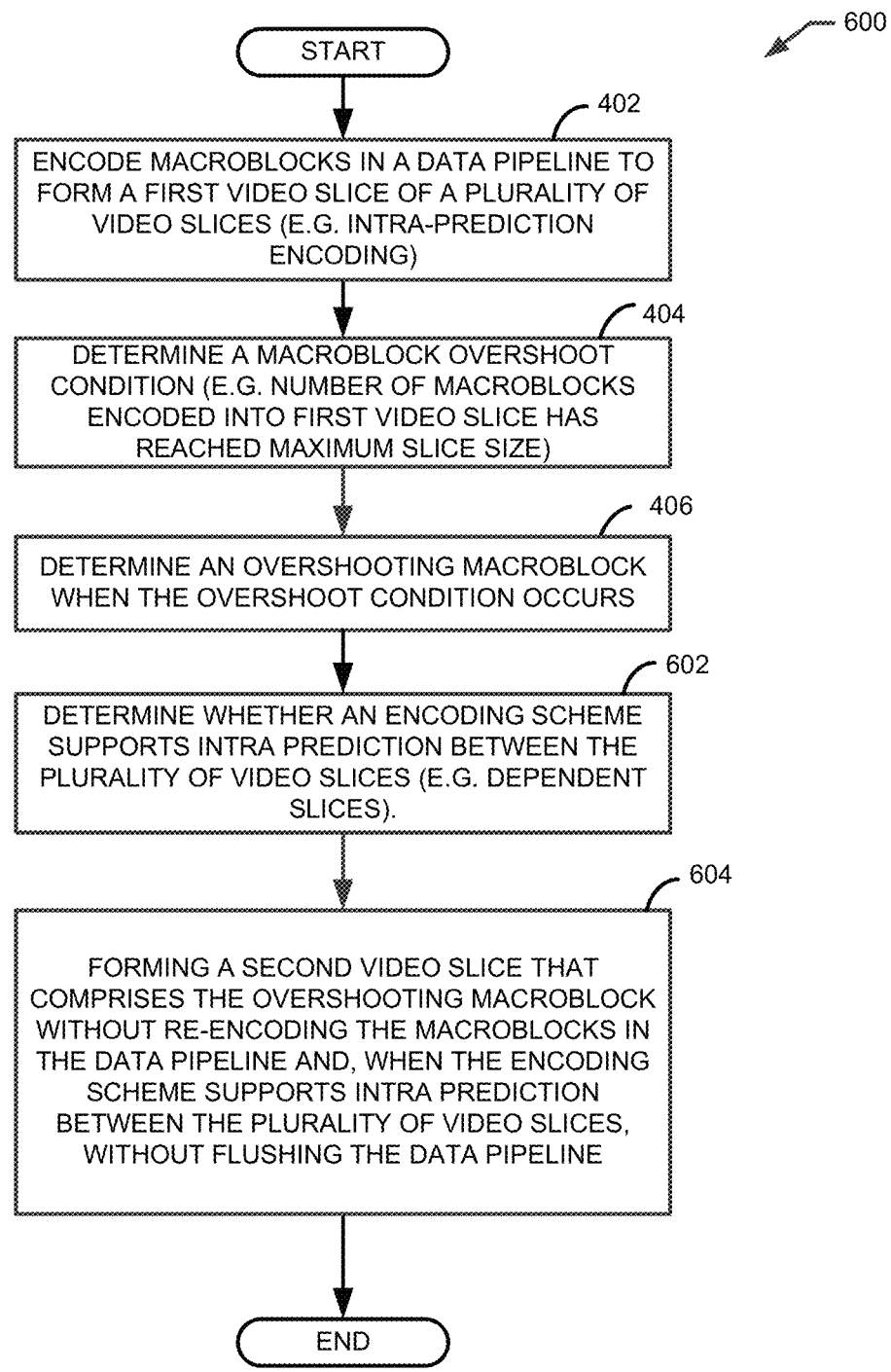
FIG. 6 is a flowchart of another example method for encoding video data into video slices and includes aspects of the method illustrated in FIG. 3.

FIG. 6 is a flowchart of yet another example method for encoding video data and includes aspects of the method illustrated in FIG. 4. Similar to the method described with respect to FIG. 4, the example method begins at block 402 where macroblocks in a data pipeline are encoded to form a first video slice of a plurality of video slices. The method may include block 404, where a macroblock overshoot condition is determined. Proceeding on to block 406, an overshooting macroblock is determined when the macroblock overshoot condition is determined. In block 602, a determination is made whether the encoding scheme supports intra-prediction between a plurality of video slices. For example, in the case of HEVC video encoding, the method may determine if dependent slices are supported. In block 604, in response to a macroblock overshoot condition, a second video slice is formed comprising the overshooting macroblock without re-encoding the macroblocks in the data pipeline, whereby the data pipeline is not flushed if the encoding scheme supports intra-prediction between a plurality of video slices. In continuing with the above example, if the HEVC video encoding does support dependent slices, a second video slice would be formed comprising the overshooting macroblock without re-encoding the macroblocks in the data pipeline and without flushing the data pipeline.

Figure 7:
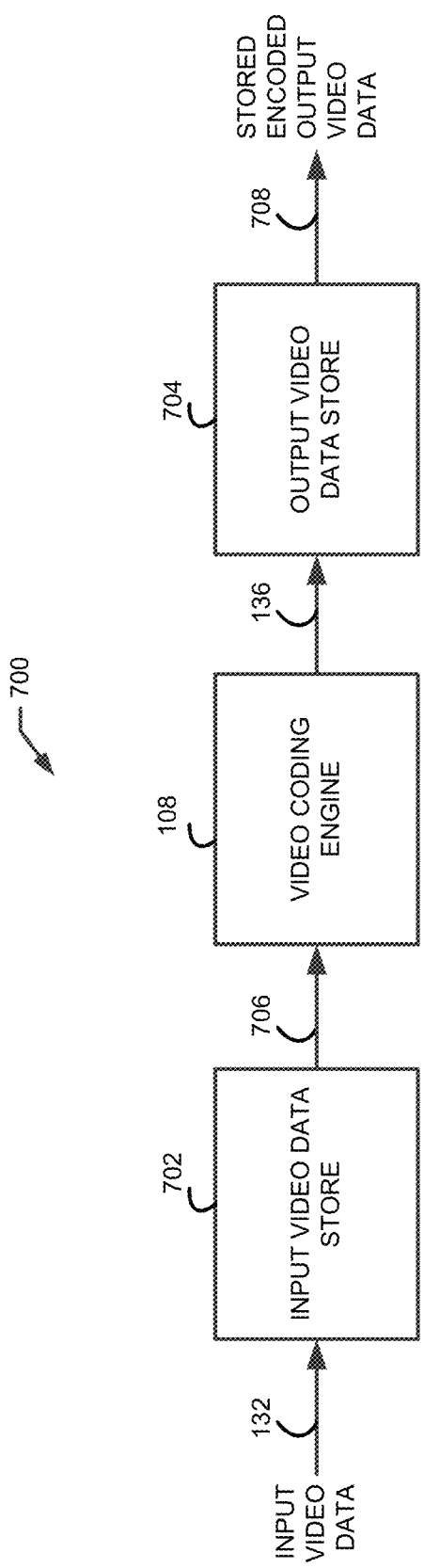
FIG. 7 is a functional block diagram illustrating an example in which an apparatus that includes video encoder logic may receive stored input video data from an input video data store, and may and send encoded output data to an output video data store.

Turning to FIG. 7, a functional block diagram of another example embodiment is shown that includes video encoder 108, along with input video data store 702 and output video data store 704. The video encoder 108 may include an encoder with a continuous encoding data pipeline 110 and a video pipeline encoder control 112 as described above with respect to FIG. 1, FIG. 2, and FIG. 3. The video encoder 108 receives stored input video data 706 from input video data store 702. Input video data store 702 may be any suitable storage mechanism, including but not limited to memory, a hard drive, CD drive, DVD drive, flash memory, any non-transitory computer readable medium such as but not limited to RAM or ROM, a cloud storage mechanism, or any suitable storage mechanism accessible via the web. Input video data store 702 receives input video data 132 and stores it for access by the video encoder 108. The video encoder 108 provides the encoded output video data 136 to the output video data store 704, which, similar to input video data store 702, can be any suitable storage mechanism, including but not limited to memory, a hard drive, any non-transitory computer readable medium such as but not limited to RAM or ROM, a cloud storage mechanism, or any suitable storage mechanism accessible via the web. The output video data store 704 stores the encoded output video data 136, and may provide stored encoded output video data 708, for example, to a display (not shown).

Figure 8:
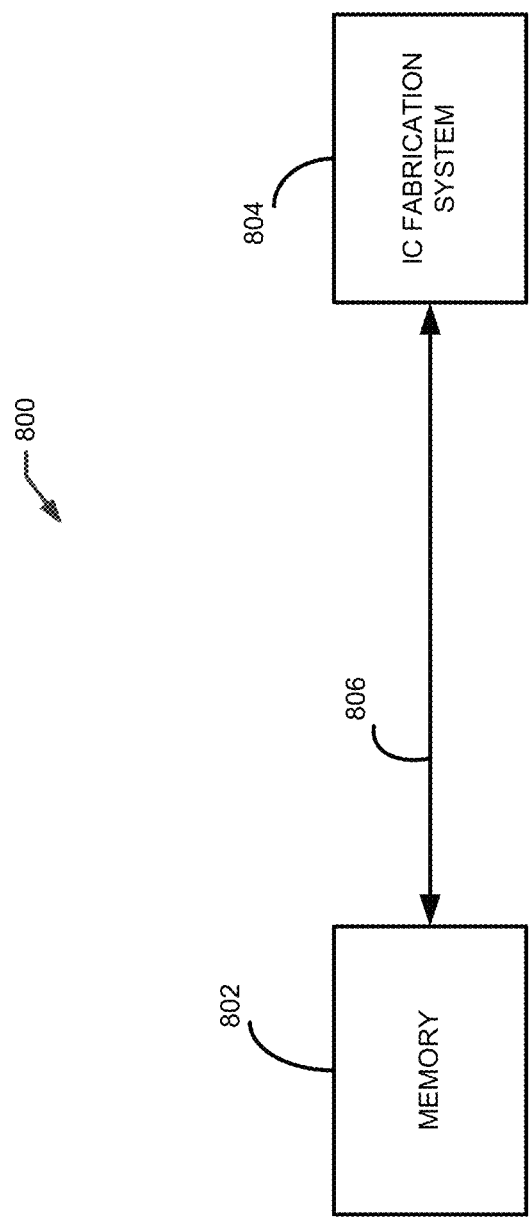
FIG. 8 is a functional block diagram illustrating one example of an integrated circuit fabrication system.

Referring to FIG. 8, an integrated circuit fabrication system 804 is shown which may include memory 802 that may be accessed via communication link 806, which may be in any suitable form and any suitable location accessible via the web, accessible via hard drive, or any other suitable way. The memory 802 is a non-transitory computer readable medium such as but not limited to RAM, ROM, and any other suitable memory. The IC fabrication system 804 may be one or more work stations that control a wafer fabrication to build integrated circuits. The memory 802 may include thereon instructions that when executed by one or more processors causes the integrated circuit fabrication system 804 to fabricate one or more integrated circuits that include the logic and structure described herein.

The disclosed integrated circuit designs may be employed in any suitable apparatus including but not limited to, for example, a mobile or smart phone, a phablet, a tablet, a camera, a laptop computer, a portable media player, a set-top box, a printer, or any other suitable device which encodes or plays video and/or displays images. Such devices may include, for example, a display that receives image data (e.g., image data that has been processed in the manner described herein, such as the encoded output vide data 136) from the one or more integrated circuits where the one or more integrated circuits may be or may include, for example, an APU, GPU, CPU or any other suitable integrated circuit(s) that provide(s) image data for output on the display. Such an apparatus may employ one or more integrated circuits as described above including one or more of the encoder with continuous encoding data pipeline logic, video pipeline encoder control logic, and other components described above.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog, or other suitable language. As such, the logic and structure described herein may also be produced as one or more integrated circuits by such systems using the computer readable medium with instructions stored therein. For example, one or more integrated circuits with the logic and structure described above may be created using such integrated circuit fabrication systems. In such a system, the computer readable medium stores instructions executable by one or more integrated circuit design systems that causes the one or more integrated circuit design systems to produce one or more integrated circuits. For example, the one or more integrated circuits may include one or more of the encoder with continuous encoding data pipeline logic, video pipeline encoder control logic, and any other components described above that process video data in a way that reduces performance penalties in pipelined video encoder systems, as described above.

Figure 9:
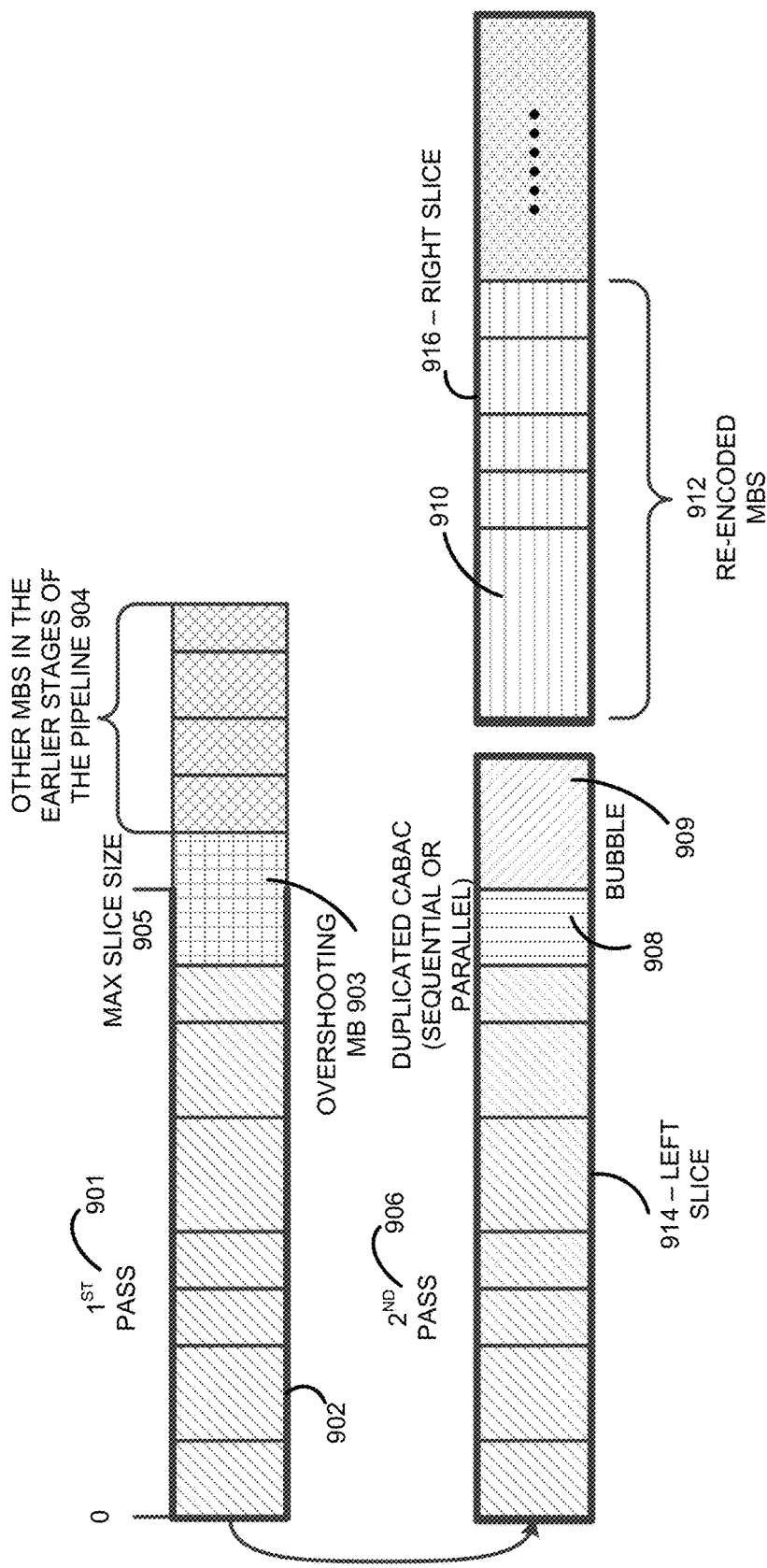
FIG. 9 is a diagram showing data from a prior art solution that would handle a maximum slice size constraint in a two-pass approach.

FIG. 9 is diagram showing data from a prior art solution that would handle a maximum slice size constraint in a two-pass approach. In this example, even if intra-prediction is allowed, the hardware pipeline must be re-encoded once a maximum slice size is reached. As shown in the figure, $1^{st}$ pass pipeline 901 includes encoded macroblocks 902, overshooting macroblock 903, and other macroblocks in earlier stages of the pipeline 904. The $2^{nd}$ pass pipeline 906 includes a left slice 914 and a right slice 916. Once a maximum slice size 905 is reached in $1^{st}$ pass pipeline 901, a left slice 914 is formed, as indicated in $2^{nd}$ pass pipeline 906. In forming the left slice 914 of $2^{nd}$ pass pipeline 906, the last macroblock of the left slice 914 is re-CABAC coded with an end-of-slice indication, as indicated by macroblock 908. To form the right slice 916 of $2^{nd}$ pass pipeline 906, the overshooting macroblock 903 and one or more of the other macroblocks in earlier stages of the pipeline 904 are re-encoded into the right slice 916 as re-encoded macroblocks 912, whereby the overshooting macroblock 903 is re-encoded into the first macroblock in the right slice 916, as indicated by macroblock 910. The re-encoded macroblocks 912 of the right slice 916 must then be re-CABAC encoded. As a result of the re-encoding process, the smaller the maximum slice size, the higher the pipeline throughput drop will be. Also, as indicated by bubble 909, the larger the bubble, the less the network efficiency will be.

Figure 10:
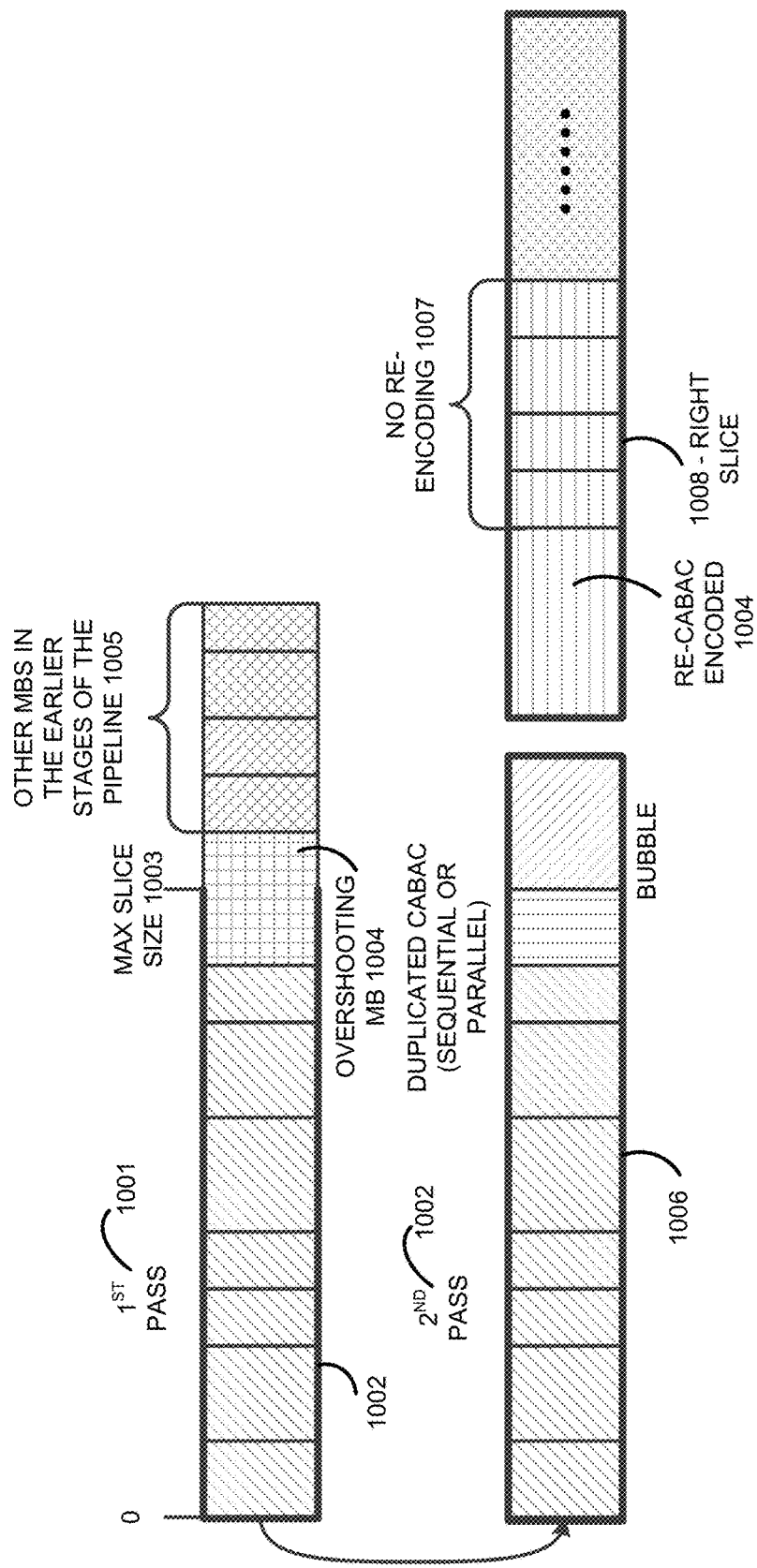
FIG. 10 is a diagram illustrating encoded data from an embodiment where there is no need to re-encode the pipeline when intra-prediction is allowed, as may be performed by continuous encoding data pipeline logic.

FIG. 10 illustrates encoded data from an embodiment where there is no need to re-encode the pipeline when intra-prediction is allowed, as may be performed by the continuous encoding data pipeline 110 of video encoder 108, described above. As shown in the figure, $1^{st}$ pass pipeline 1001 includes encoded macroblocks 1002, overshooting macroblock 1003, and other macroblocks in earlier stages of the pipeline 1005. The $2^{nd}$ pass pipeline 1002 includes a left slice 1006 and a right slice 1008. For example, after a maximum slice size 1003 is reached in $1^{st}$ pass pipeline 1001, the overshooting macroblock 1004 may become the first macroblock in the right slice 1008 of $2^{nd}$ pass pipeline 1002, as indicated by macroblock 1004. Additionally, as indicated by macroblocks 1007 in the figure, one or more macroblocks 1005 in the pipeline may not be re-encoded, and may instead proceed to be included in right slice 1008 of $2^{nd}$ pass pipeline 1002. The overshooting macroblock 1003 may be re-CABAC encoded, as is indicated by macroblock 1004 in the right slice 1008 of $2^{nd}$ pass pipeline 1002, if the overshooting macroblock 1003 was previously CABAC encoded as part of a different slice. Although there may be a small drop in throughput, the stall is expectedly smaller than the stall for re-encoding the entire pipeline.

Among other advantages, for example, the disclosed methods and apparatus allow video encoding to proceed without the need to re-encode the data pipeline. In addition, the disclosed methods and apparatus eliminate the need to flush the data pipeline. As a result, computational time and power is saved, and encoding performance penalty is reduced, thereby increasing encoder throughput. Other advantages will be recognized by those of ordinary skill in the art.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of encoding video data, comprising:
encoding macroblocks in a data pipeline to form a first video slice of a plurality of video slices associated with a frame of video;
responsive to a macroblock overshoot condition indicating that the first video slice has reached a maximum number of macroblocks, forming a second video slice that comprises at least one of: an overshooting macroblock that caused the macroblock overshoot condition; and the encoded macroblocks, without re-encoding the at least one of: the overshooting macroblock and the encoded macroblocks.

2. The method of claim 1, further comprising:
determining whether an encoding scheme supports intra-prediction between the plurality of video slices;
wherein forming the second video slice further comprises not flushing the data pipeline when the encoding scheme supports intra-prediction between the plurality of video slices.

3. The method of claim 2, wherein the determining of whether the encoding scheme supports intra-prediction between the plurality of video slices comprises reading control registers.

4. The method of claim 1 comprising determining the overshooting macroblock when the macroblock overshoot condition occurs.

5. The method of claim 1, further comprising:
entropy encoding the plurality of video slices;
classifying a last fully entropy encoded macroblock as a last macroblock; and
re-entropy encoding the overshooting macroblock.

6. The method of claim 1, further comprising integer motion estimation, fractional motion estimation, and transform encoding of the plurality of video slices.

7. The method of claim 1, further comprising providing the plurality of video slices to a transmit device for transmission to a remote video decoder.

8. An apparatus for encoding video data, the apparatus comprising:
video encoder logic structured to encode macroblocks in a data pipeline to form a first video slice of a plurality of video slices associated with a frame of video, and to form, in response to a macroblock overshoot condition indicating that the first video slice has reached a maximum number of macroblocks, a second video slice that comprises at least one of: an overshooting macroblock that caused the macroblock overshoot condition and the encoded macroblocks, without re-encoding the at least one of: the overshooting macroblock and the encoded macroblocks.

9. The apparatus of claim 8, further comprising determination logic structured to determine whether an encoding scheme supports intra-prediction between the plurality of video slices, wherein the video encoder logic is structured to not flush the data pipeline when the encoding scheme supports intra-prediction between the plurality of video slices.

10. The apparatus of claim 9 wherein the determination logic is structured to access control registers that indicate whether the encoding scheme supports intra-prediction between the plurality of video slices.

11. The apparatus of claim 8, further comprising macroblock overshoot logic operatively coupled to the video encoder logic, the macroblock overshoot logic structured to determine the overshooting macroblock when the macroblock overshoot condition occurs.

12. The apparatus of claim 8, further comprising entropy encoding logic structured to:
entropy encode the plurality of video slices;
classify a last fully entropy encoded macroblock as a last macroblock; and
re-entropy encode the overshooting macroblock.

13. The apparatus of claim 8, further comprising:
integer motion estimation logic structured to operate on the plurality of video slices;
fractional motion estimation logic structured to operate on the plurality of video slices; and
transform encoding logic structured to operate on the plurality of video slices.

14. The apparatus of claim 8, further comprising transmit logic structured to transmit the encoded video data to a remote video decoder.

15. The apparatus of claim 8, further comprising at least one of an accelerated processing unit (APU), a central processing unit (CPU), and a graphics processing unit (GPU), wherein the at least one of the APU, the CPU, and the GPU includes the video encoder logic, and the macroblock overshoot logic, and wherein the at least one of the APU, the CPU, and the GPU is operative to provide the encoded video data for display on a display.

16. A non-transitory computer readable medium comprising executable instructions that when executed cause an integrated circuit (IC) fabrication system to fabricate one or more ICs that comprise:
video encoder logic structured to encode macroblocks in a data pipeline to form a first video slice of a plurality of video slices associated with a frame of video, and to form, in response to a macroblock overshoot condition indicating that the first video slice has reached a maximum number of macroblocks, a second video slice that comprises at least one of: an overshooting macroblock that caused the macroblock overshoot condition and the encoded macroblocks, without re-encoding the at least one of: the overshooting macroblock and the encoded macroblocks.

17. The non-transitory computer readable medium of claim 16 comprising executable instructions that when executed cause the IC fabrication system to fabricate the one or more ICs such that one or more ICs further comprise determination logic structured to determine whether an encoding scheme supports intra-prediction between the plurality of video slices, wherein the video encoder logic is structured to not flush the data pipeline when the encoding scheme supports intra-prediction between the plurality of video slices.

18. The non-transitory computer readable medium of claim 16 comprising executable instructions that when executed cause the IC fabrication system to fabricate the one or more ICs that comprise macroblock overshoot logic operatively coupled to the video encoder logic, the macroblock overshoot logic structured to determine the overshooting macroblock when the macroblock overshoot condition occurs.

19. The non-transitory computer readable medium of claim 16 comprising executable instructions that when executed cause the IC fabrication system to fabricate the one or more ICs such that one or more ICs further comprise entropy encoding logic structured to:
entropy encode the plurality of video slices;
classify a last fully entropy encoded macroblock as a last macroblock; and
re-entropy encode the overshooting macroblock.

20. The non-transitory computer readable medium of claim 16 comprising executable instructions that when executed cause the IC fabrication system to fabricate the one or more ICs such that one or more ICs further comprise transmit logic structured to transmit the encoded video data to a remote video decoder.

* * * * *